No. 637,205. Patented Nov. 14, 1899.
F. H. HEATH.
BALL BEARING FOR CYCLES.
(Application filed Apr. 12, 1898.)
(No Model.)
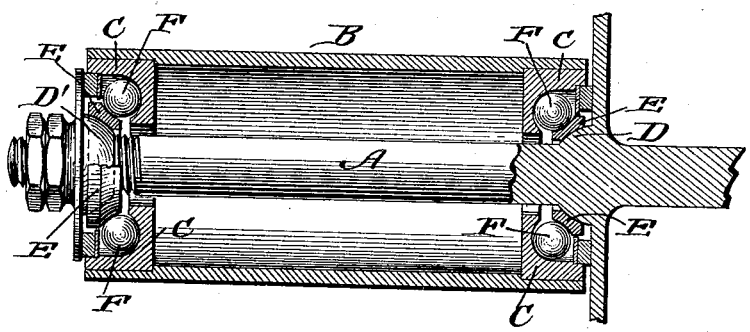
WITNESSES:
INVENTOR
Frederick H. Heath.
BY
ATTORNEYS.

UNITED STATES PATENT OFFICE.

FREDERICK H. HEATH, OF TACOMA, WASHINGTON.

BALL-BEARING FOR CYCLES.

SPECIFICATION forming part of Letters Patent No. 637,205, dated November 14, 1899.

Application filed April 12, 1898. Serial No. 677,269. (No model.)

*To all whom it may concern:*

Be it known that I, FREDERICK H. HEATH, a citizen of the United States, residing at Tacoma, in the county of Pierce and State of Washington, have invented a certain new and useful Improvement in Ball-Bearings for Bicycles and the Like, of which the following is a specification.

My invention is an improvement in the class of spherical and ball bearings—that is to say, bearings in which one of the two members or surfaces between which the balls run is formed on spherical lines. It is demonstratable that bearings of this character have great superiority over those in which the ordinary or straight-faced cone is employed, since no cramping or binding action and hence no increase of friction result in case of malalinement of the cups or a bend or spring of the axle or shaft, the balls continuing to run in circular paths of the same diameter.

My invention is embodied in the construction and combination of parts hereinafter described and claimed.

In the accompanying drawing I represent a central longitudinal section of a bearing for a bicycle or the like constructed according to my invention.

A indicates the axle-journal, and B the hub, of the bicycle or the like. Two annular cups C C are secured in the ends of the hub. Upon the ends of the journal A are arranged two bearing members D D', one being the fixed and the other the adjusting member. These are formed on spherical lines. The inner or cone bearing member E has an annular form, and its inner side is made concave to adapt it to fit upon the hemispherical members D D'. Its outer side is preferably grooved circumferentially to form a seat and circular path for the balls F, which are arranged to run between such member E and the cup C, as shown. The member E is adapted for movement upon the members D D' to allow for irregularities in the alinement of the cup members or for bend or spring of the axle.

While the drawing illustrates a "two-point" bearing, it will be understood that I do not restrict myself thereto, since my invention is applicable as well to a "three-point" bearing.

In further explanation of the invention I will state that in practice it is better that the stationary member of the bearing be the spherically-seated one.

What I claim is—

1. In combination, a hub, a cup member fitted therein, a spherical member carried by the axle, a cone member fitted to the last-named member so as to automatically adjust itself thereon, and a series of balls fitted between the bearing-surfaces of the cup and the cone, as specified.

2. In combination, a hub, an axle, a cup, and a bearing member on the axle, one of which members is formed on spherical lines, and an annular cone member which is fitted to the spherical member and adapted to automatically adjust itself thereon, as shown and described.

In testimony whereof I have hereunto affixed my signature in the presence of two subscribing witnesses.

FREDERICK H. HEATH.

Witnesses:
H. K. MOORE,
C. P. FERRY.